May 19, 1936.  M. E. MUSE  2,041,261
WEATHER STRIPPING FOR DOORS
Filed Aug. 14, 1935

Inventor
M. E. Muse
Wilkinson & Mawhinney
Attorneys.

Patented May 19, 1936

2,041,261

UNITED STATES PATENT OFFICE 2,041,261

WEATHER STRIPPING FOR DOORS

Morris E. Muse, Sherburne, La.

Application August 14, 1935, Serial No. 36,194

1 Claim. (Cl. 20—68)

The present invention relates to improvements in weather stripping for doors, and has for an object to provide an improved arrangement whereby weather stripping is movably mounted in a door to the end that when the door is opened the weather stripping will be drawn up within the same, but when the door is closed such weather stripping will be projected down firmly against the floor to avoid drafts.

Another object of the invention is to provide a simple and economical form of automatic weather stripping which may be easily applied to standard forms of doors.

With the foregoing and other objects in view, the invention will be more fully described hereinafter, and will be more particularly pointed out in the claim appended hereto.

In the drawing, wherein like symbols refer to like or corresponding parts throughout the several views.

Figure 1:
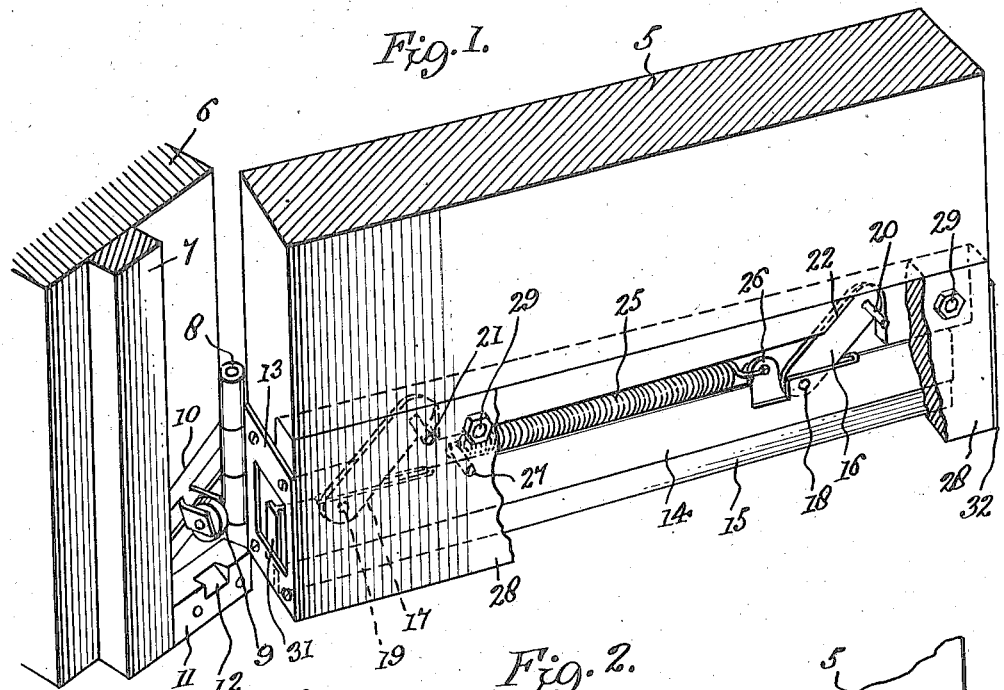
Figure 1 is a fragmentary perspective view of door and door frame embodying automatic weather stripping constructed in accordance with the present invention.

Referring more particularly to the drawing, 5 designates a conventional door hinged to the door frame 6 and adapted to close against the stop 7. The hinge is indicated at 8.

The door frame 6 carries a roller 9 on a frame 10 suitably affixed to said door frame 6.

The door frame also carries a block 11 of rubber, felt or other material having the cut-a-way portion 12 with a diagonal wall for a purpose to be hereinafter described.

Figure 3:
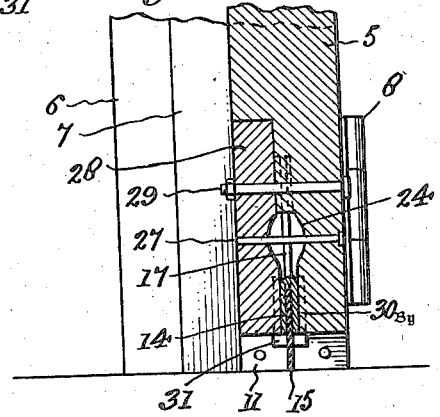
Figure 3 is a cross-section taken on the line 3—3 in Figure 2.

The roller 9 is adapted to project through an open rectangular frame 13 of metal or other appropriate material, affixed by screws or otherwise, to the edge of the door 5 which closes against said door frame 6. The opening through the rectangular frame 12 leads into an interior space formed in the lower portion of the door in which is housed a bar 14 of an inverted U-shaped construction, as seen in Figure 3, for the purpose of receiving and carrying the weather strip material 15. This material may be of rubber, felt, or any of the materials out of which weather stripping may be made. The bar 14 is carried by two links 16 and 17 pivoted to the bar 14 at 18 and 19, and pivoted to the door at 20 and 21. The upper portions of these links move back and forth in recesses 22 and 23 formed in the door at the ends of a channel 24 which accommodates a coil spring 25. One end of this coil spring is secured to a clip 26 on the bar 14, while the other end of the spring is anchored to the door, the same being shown as affixed to a cross pin 27.

Figure 2:
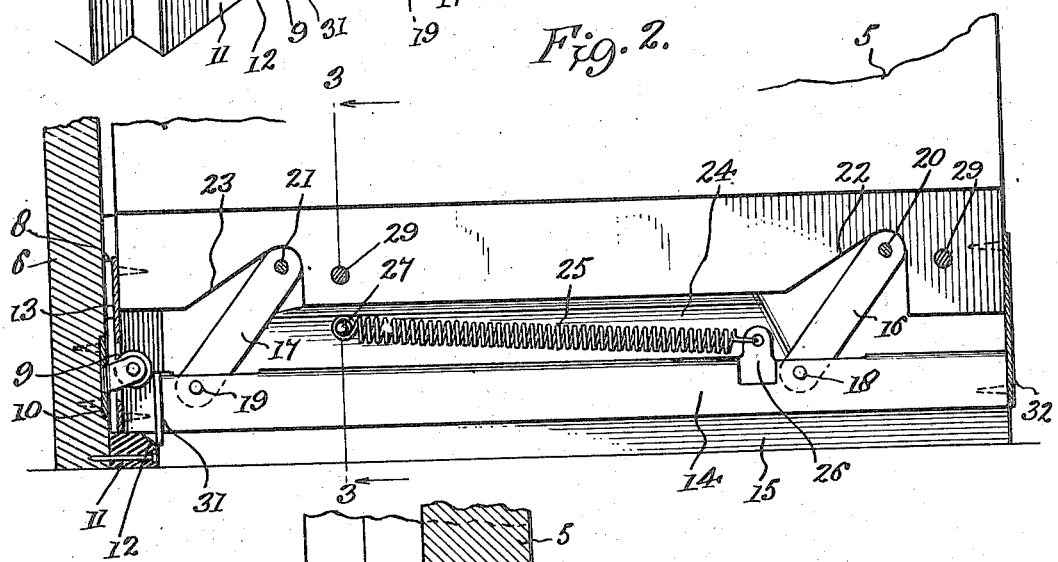
Figure 2 is a fragmentary front elevation, with parts broken away and parts shown in section, and with the weather stripping in the projected position.

As shown in Figure 3, the side walls of the channel 24 are bulged outwardly and are formed partly in the door and partly in a filler strip 28 which fits into a cut-a-way portion in the lower part of the door and is held in place by two or more bolts 29. This strip or section 28 may be removed by withdrawing the bolts 29 in order to give access to the working parts of the device and to the recesses and channel. The bar 14 moves up and down and slides endwise in a groove 30 extending below the channel 24 and composed in part of the body of the door and the filler strip 28. This groove 30 opens downwardly and permits the weather stripping 15 to project below the door as shown in Figures 2 and 3.

At one end of the bar 14 is a head plate 31 positioned to be engaged by the roller 9. At the other end of the door is an end plate 32 against which the bar 14 and the weather stripping are moved in the projected position of these parts.

In the use of the device, when the door is open, as shown in Figure 1, the spring 25 contracts, swinging the links 16 and 17 up against the inclined walls of the recesses 22 and 23 and thus raising the bar 14 and the weather stripping 15 to a position entirely within the confines of the lower part of the door.

When the door is closed, the roller 9 will be thrust through the opening in the plate 13 striking the head plate 31 and causing the bar 14 to shift over until its end strikes the enclosing plate 32. This motion will be required because of the links 16 and 17 swinging down. The weather stripping 15 will be thrust out through the groove 30 and forcibly against the floor or threshold. Thus drafts will not be allowed to pass under the door, and owing to the tight fit of the bar 14 in the groove 30 drafts will not be enabled to pass upwardly about the weather stripping and the bar. The enclosing plate 32 at one end closes off all likelihood of drafts passing about that end of the device and the close relation between the bottom of the head plate 31 and the diagonal wall of the recess 12 of cushion block 11 will avoid drafts entering in this direction. It will be noted that the lower end of the head 31 projects below the bar 14 and it may be arranged so as to become slightly embedded in the rubber of the block 11 when the door is fully closed. This lower projecting end piece of the striker head 31 moves in a diagonal line and hence the form of the groove 12.

It is to be understood that the strip 28 may be made integral with the door, and thus eliminate the detachable feature when desired, as in instances of where the door is relatively thick, as manufactured in most factories.

It is obvious that various changes and modifications may be made in the details of construction and design of the above specifically described embodiment of this invention without departing from the spirit thereof, such changes and modifications being restricted only by the scope of the following claim.

What is claimed is:

In combination with a door and its frame, said door having a rabbeted portion in its lower edge, a filler strip disposed in said rabbeted portion, said door having a channel opening through the lower edge thereof, a U-shaped bar in said channel, weather stripping carried by the bar, said bar having a pair of spaced apart slots opening through the bight thereof, a pair of links each having an end disposed in a slot, means for pivotally securing the links to the bar, means for pivotally securing the links to the door, a strike plate secured to the door and closing one end of the channel, a T-shaped head plate secured to the end of the bar opposite from said strike plate, a roller secured to the door frame and adapted to engage the head plate when the door is closed, a contractile spring secured to the bar and the door and constantly urging the bar to inoperative position within the channel, and a yieldable block fixed to the door frame beneath said roller and closing the space between the adjacent end of the bar and weather strip and the door frame.

MORRIS E. MUSE.